US012202436B2

(12) United States Patent
Yeung et al.

(10) Patent No.: US 12,202,436 B2
(45) Date of Patent: Jan. 21, 2025

(54) DISTANCE MODELING FOR VEHICLE PASSIVE ENTRY

(71) Applicant: Rivian IP Holdings, LLC, Plymouth, MI (US)

(72) Inventors: Fai Yeung, Palo Alto, CA (US); Leonid Kokhnovych, Burnaby (CA); Vivek Ravi, San Jose, CA (US); Arjuna Sivasithambaresan, San Francisco, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 58 days.

(21) Appl. No.: 18/106,196

(22) Filed: Feb. 6, 2023

(65) Prior Publication Data

US 2024/0051497 A1 Feb. 15, 2024

Related U.S. Application Data

(60) Provisional application No. 63/397,739, filed on Aug. 12, 2022.

(51) Int. Cl.
*B60R 25/24* (2013.01)
*B60R 25/01* (2013.01)
*H04B 17/318* (2015.01)

(52) U.S. Cl.
CPC ............ *B60R 25/245* (2013.01); *B60R 25/01* (2013.01); *H04B 17/318* (2015.01); *B60R 2325/101* (2013.01)

(58) Field of Classification Search
None
See application file for complete search history.

(56) References Cited

U.S. PATENT DOCUMENTS

| | | | | |
|---|---|---|---|---|
| 9,702,963 | B2* | 7/2017 | Kalliola | G01S 13/931 |
| 10,427,643 | B1* | 10/2019 | Casamassima | H04B 17/318 |
| 11,753,861 | B2* | 9/2023 | Budd | E05F 15/76 |
| | | | | 340/5.7 |
| 11,790,413 | B2* | 10/2023 | Hoffberg | G07F 17/323 |
| | | | | 705/14.1 |
| 2014/0106782 | A1* | 4/2014 | Chitre | H04W 4/021 |
| | | | | 455/456.2 |
| 2014/0132391 | A1* | 5/2014 | Eder | G07C 9/00309 |
| | | | | 340/5.21 |
| 2014/0349670 | A1* | 11/2014 | Jintaseranee | H04W 64/00 |
| | | | | 455/422.1 |
| 2015/0254913 | A1* | 9/2015 | Obata | G07C 9/30 |
| | | | | 340/5.72 |
| 2015/0365208 | A1* | 12/2015 | Hyun | H04W 4/80 |
| | | | | 370/310 |
| 2021/0185095 | A1* | 6/2021 | Harel | G06F 9/45558 |
| 2022/0108262 | A1* | 4/2022 | Cella | G06Q 10/063118 |

* cited by examiner

*Primary Examiner* — Carlos Garcia
(74) *Attorney, Agent, or Firm* — Haley Guiliano LLP

(57) ABSTRACT

Systems and methods are provided for providing passive entry to a vehicle to a user with an authorized mobile device. Responsive to receiving, at a vehicle and from an application executing on a mobile device associated with a user, one or more signals associated with the mobile device, a signal strength and contextual information associated with the mobile device is determined based on the one or more signals. A passive entry feature of the vehicle is initiated based on the signal strength and the contextual information.

20 Claims, 8 Drawing Sheets

DISTANCE MODELING FOR VEHICLE PASSIVE ENTRY

CROSS-REFERENCE TO RELATED APPLICATION

This application claims priority to U.S. Provisional Patent Application No. 63/397,739, filed on Aug. 12, 2022, the entire contents of which are hereby expressly incorporated by reference herein in their entirety.

INTRODUCTION

The present disclosure is directed to using a mobile device as a key for a vehicle and, more particularly, to providing reliable passive entry as a user approaches a vehicle with a mobile device.

SUMMARY

In some approaches, a mobile device of a user may communicate with a vehicle using a Bluetooth connection (e.g., a two-way connection according to the Bluetooth low energy (BLE) standard) when the mobile device is within BLE range of the vehicle. Based on the received signal strength of the BLE signal (e.g., received signal strength indicator (RSSI)), the vehicle may estimate the distance between an approaching mobile device and the vehicle in real time and automatically unlock the vehicle when the mobile device is estimated to be within a predetermined range of the vehicle. However, depending on the type of mobile device and environmental factors (e.g., the personal device is in the pocket of a user), the estimated distance may not be accurate, and reliable passive entry may not be provided. Consequently, what is needed are techniques for enabling reliable distance modeling based on RSSI for a variety of different mobile devices under a variety of environmental conditions so that reliable passive entry is provided.

In accordance with the present disclosure, systems and methods are provided using contextual information associated with a mobile device to improve the accuracy and robustness of distance estimation in passive entry features of a vehicle. In some embodiments, a method is provided. The method includes receiving, at a vehicle and from an application executing on a mobile device associated with a user, one or more signals associated with the mobile device, and determining, using processing circuitry, a signal strength and contextual information associated with the mobile device based on the one or more signals. The method further includes initiating, using the processing circuitry, a passive entry feature of the vehicle (e.g., unlocking the vehicle, waking up one or more domain controller of the vehicle, or other passive entry features) based on the signal strength and the contextual information.

In some embodiments, the method may further include receiving, using the processing circuitry, device profile information associated with the mobile device based on the one or more signals. In some embodiments, initiating the passive entry feature may be further based on the device profile information.

In some embodiments, initiating the passive entry feature may include selecting, among a plurality of distance models, a distance model corresponding to the device profile information passive entry feature and the contextual information; determining a distance between the vehicle and the mobile device based on the selected distance model and the signal strength; and initiating the passive entry feature when the determined distance is within a predetermined distance.

In some embodiments, each of the plurality of distance models may include a calibrated received signal strength indicator (RSSI) value when the mobile device is at a predetermined distance from the vehicle and a scaling factor corresponding to the contextual information. In some embodiments, determining the distance between the vehicle and the mobile device may include determining the distance based on the calibrated RSSI value and the scaling factor of the selected distance model and the signal strength.

In some embodiments, the passive entry feature may include unlocking a door of the vehicle.

In some embodiments, the contextual information may include an indication that the mobile device is in a pocket of the user or an indication that the mobile device is in a hand of the user. In some embodiments, in response to the contextual information including an indication that the mobile device is in the pocket of the user, the selected distance model may include a calibrated received signal strength indicator (RSSI) value that was calibrated when the mobile device is in the pocket of the user and the user is sitting in the vehicle, and determining the distance between the vehicle and the mobile device may include determining the distance based on the calibrated RSSI value and the signal strength.

In some embodiments, the method may further include reducing, in response to the contextual information including an indication that the mobile device is quickly approaching the vehicle, a number of samples of the one or more signals required for initiating the passive entry feature.

In some embodiments, the method may further include modifying, in response to the contextual information including an indication that the mobile device is in a geofenced area, a distance proximity between the vehicle and the mobile device for initiating the passive entry feature.

In some embodiments, the method may further include establishing a secure Bluetooth low energy (BLE) link between the mobile device and the vehicle and receiving the one or more signals over the secure BLE link. In some embodiments, the contextual information may be included in a header in a packet in the one or more signals received over the secure BLE link.

In some embodiments, the contextual information may include information indicating whether the mobile device is in a pocket of the user, whether the mobile device is in a geofenced area, or whether the mobile device is moving quickly towards the vehicle, or combinations thereof.

In some embodiments, a vehicle is provided. The vehicle includes a transceiver, a memory storing instructions, and processing circuitry. The processing circuitry is configured to execute the instructions stored in the memory to receive, via the transceiver and from an application executing on a mobile device associated with a user, one or more signals associated with the mobile device; determine a signal strength and contextual information associated with the mobile device based on the one or more signals; and initiate a passive entry feature of the vehicle based on the signal strength and the contextual information.

In some embodiments, the processing circuitry may be further configured to receive device profile information associated with the mobile device based on the one or more signals, and to initiate the passive entry feature further based on the device profile information.

In some embodiments, the processing circuitry may be configured to initiate the passive entry feature by selecting, among a plurality of distance models, a distance model corresponding to the device profile information and the contextual information; determining a distance between the vehicle and the mobile device based on the selected distance model and the signal strength; and initiating the passive entry feature when the determined distance is within a predetermined distance.

In some embodiments, each of the plurality of distance models may include an RSSI value when the mobile device is at a predetermined distance from the vehicle and a scaling factor corresponding to the contextual information. In some embodiments, the processing circuitry may be configured to determine the distance between the vehicle and the mobile device by determining the distance based on the calibrated RSSI value and the scaling factor of the selected distance model and the signal strength.

In some embodiments, the passive entry feature may include unlocking a door of the vehicle.

In some embodiments, the contextual information may include an indication that the mobile device is in a pocket of the user or an indication that the mobile device is in a hand of the user. In some embodiments, in response to the contextual information comprising an indication that the mobile device is in the pocket of the user, the selected distance model may include a calibrated received signal strength indicator (RSSI) value that was calibrated when the mobile device is in the pocket of the user and the user is sitting in the vehicle, and the processing circuitry may be configured to determine the distance between the vehicle and the mobile device by determining the distance based on the calibrated RSSI value and the signal strength.

In some embodiments, the processing circuitry may be further configured to reduce, in response to the contextual information including an indication that the mobile device is quickly approaching the vehicle, a number of samples of the one or more signals required for initiating the passive entry feature; and modify, in response to the contextual information including an indication that the mobile device is in a geofenced area, a distance proximity between the vehicle and the mobile device for initiating the passive entry feature.

In some embodiments, a non-transitory, computer-readable medium having non-transitory, computer-readable instructions encoded thereon is provided. When the instructions are executed by the processing circuitry, the instructions cause the processing circuitry to receive, at a vehicle and from an application executing on a mobile device associated with a user, one or more signals associated with the mobile device; determine a signal strength and contextual information associated with the mobile device based on the one or more signals; and initiate a passive entry feature of the vehicle based on the signal strength and the contextual information.

In some embodiments, execution of the instructions may further cause the processing circuitry to receive device profile information associated with the mobile device based on the one or more signals. In some embodiments, execution of the instructions to initiate the passive entry feature may further cause the processing circuitry to initiate the passive entry feature further based on the device profile information.

In some embodiments, execution of the instructions to initiate the passive entry feature may further cause the processing circuitry to select, among a plurality of distance models, a distance model corresponding to the device profile information and the contextual information; determine a distance between the vehicle and the mobile device based on the selected distance model and the signal strength; and initiate the passive entry feature when the determined distance is within a predetermined distance. In some embodiments, the passive entry feature may include unlocking a door of the vehicle.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
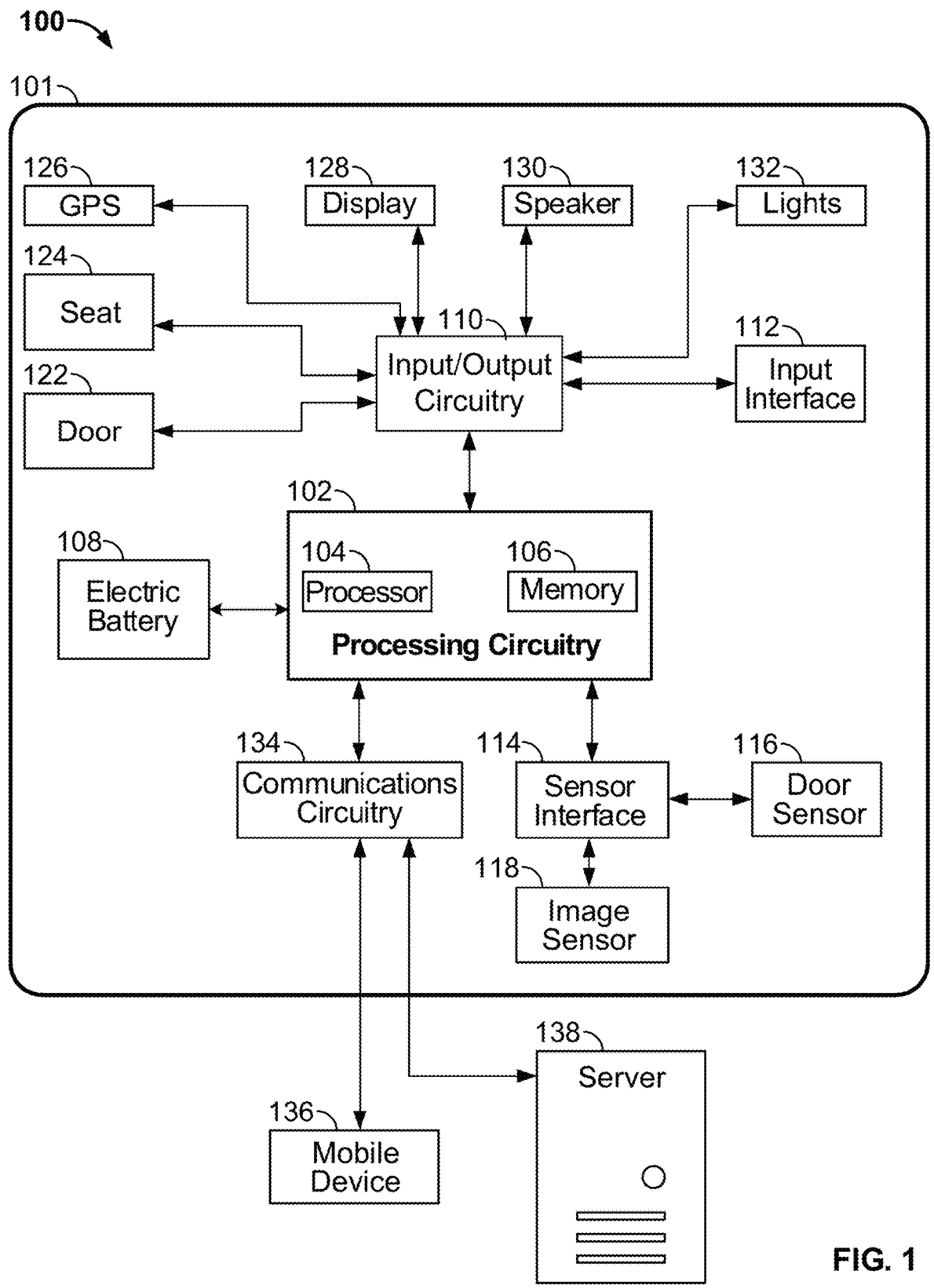
FIG. 1 shows a block diagram of components of a system of a vehicle for providing passive entry to an approaching user of the vehicle (e.g., the driver), in accordance with some embodiments of the present disclosure.

FIG. 1 shows a block diagram of components of a system 100 of vehicle 101 for providing passive entry to an approaching user of vehicle 101 (e.g., the driver), in accordance with some embodiments of the present disclosure. Vehicle 101 may be a car (e.g., a coupe, a sedan, a truck, an SUV, a bus), a motorcycle, an aircraft (e.g., a drone), a watercraft (e.g., a boat), or any other type of vehicle. Vehicle 101 may be an electric vehicle, internal combustion engine vehicle, hybrid vehicle, or any other type of vehicle.

Vehicle 101 may comprise processing circuitry 102, which may comprise processor 104 and memory 106. Processor 104 may comprise a hardware processor, a software processor (e.g., a processor emulated using a virtual machine), or any combination thereof. In some embodiments, processor 104 and memory 106 in combination may be referred to as processing circuitry 102 of vehicle 101. In some embodiments, processor 104 alone may be referred to as processing circuitry 102 of vehicle 101. Memory 106 may comprise hardware elements for non-transitory storage of commands or instructions, that, when executed by processor 104, cause processor 104 to operate vehicle 101 in accordance with embodiments described above and below. Processing circuitry 102 may be communicatively connected to components of vehicle 101 via one or more wires, or via wireless connection.

Processing circuitry 102 may be communicatively connected to electric battery 108, which may be configured to provide power to one or more of the components of vehicle 101 during operation. Image sensor 118 (e.g., a camera) may be communicatively coupled to processing circuitry 102 (e.g., by way of sensor interface 114) and positioned at any suitable position in an interior or exterior of vehicle 101. In some embodiments, image sensor 118 may capture images of destinations traveled to by vehicle 101 to identify the environment in which vehicle 101 is parked (e.g., an outdoor parking lot, an indoor parking lot, a garage, the number of nearby vehicles, etc.). Processing circuitry 102 may be communicatively connected to input interface 112 (e.g., a steering wheel, a touchscreen display, buttons, knobs, a microphone or other audio capture device, etc.) via input/output circuitry 110. In some embodiments, a driver of vehicle 101 may be permitted to select certain settings in connection with the operation of vehicle 101 (e.g., passive entry settings). In some embodiments, processing circuitry 102 may be communicatively connected to Global Positioning System (GPS) system 126 of vehicle 101, where the driver may interact with the GPS system via input interface 112. GPS system 126 may be in communication with multiple satellites to ascertain the vehicle's location and provide navigation directions to processing circuitry 102. As another example, the positioning device may operate on terrestrial signals, such as cell phone signals, Wi-Fi signals, or ultra-wideband signals to determine a location of vehicle 101. The determined location may be in any suitable form such as a geographic coordinate, a street address, a nearby landmark such as an identification of the nearest charging station or a tagged location associated with the vehicle (e.g., a location of a home of the user stored in memory 106).

Processing circuitry 102 may be communicatively connected to door 122, seat 124, display 128, speaker 130, and lights 132, by way of input/output circuitry 110. In some embodiments, input/output circuitry 110 may comprise one or more domain controllers. Display 128 may be located at a dashboard of vehicle 101 and/or a heads-up display at a windshield of vehicle 101. For example, an interface for GPS system 126 or an interface of an infotainment system may be generated for display, and display 128 may comprise an LCD display, an OLED display, an LED display, or any other type of display. In some embodiments, display 128 may provide a driver with a navigation interface, an entertainment interface, a backup camera interface, etc. Speaker 130 may be located at any location within the cabin of vehicle 101, e.g., at the dashboard of vehicle 101, on an interior portion of the vehicle door. In some embodiments, speaker 130 may provide audio that is audible outside of vehicle 101 (e.g., a personalized greeting during a welcome action of the vehicle). Lights 132 may be interior or exterior lights that provide light from inside or outside of vehicle 101 (e.g., during a welcome action of the vehicle). Processing circuitry 102 may also be communicatively connected (e.g., by way of sensor interface 114) to door sensor 116 (e.g., which may sense an open door of vehicle 101).

Processing circuitry 102 may be in communication (e.g., via communications circuitry 134) with mobile device 136 (e.g., of the driver of vehicle 101). Such connection may be wired or wireless. In one example, such a connection is a two-way connection via the BLE standard (e.g., via a BLE transceiver). In some embodiments, communications circuitry 134 and/or mobile device 136 may be in communication with one or more servers 138 (e.g., over a communications network such as, for example, the Internet). As explained in further detail in FIG. 2, vehicle 101 may include a vehicle access system (VAS) (e.g., implemented by processing circuitry 102 and communications circuitry 134) for initiating passive entry features (e.g., providing passive entry to vehicle 101) in response to determining that mobile device 136 has approached within a predetermined distance from vehicle 101 (e.g., two meters). In some embodiments, in order to improve distance modeling based on RSSI values, mobile device 136 may collect and share contextual information of mobile device 136 (e.g., that may affect RSSI values) with vehicle 101, as explained in further detail below. In some embodiments, distance modeling may also be based on profile information of mobile device 136, as explained in further detail below.

It should be appreciated that FIG. 1 shows only some of the components of vehicle 101, and it will be understood that vehicle 101 also includes other elements commonly found in vehicles, e.g., a motor, brakes, wheels, wheel controls, turn signals, windows, doors, etc. Vehicle 101 may also include a plurality of domain controllers and a central controller for managing power modes of components of vehicle 101 (e.g., during a passive entry feature).

Figure 2:
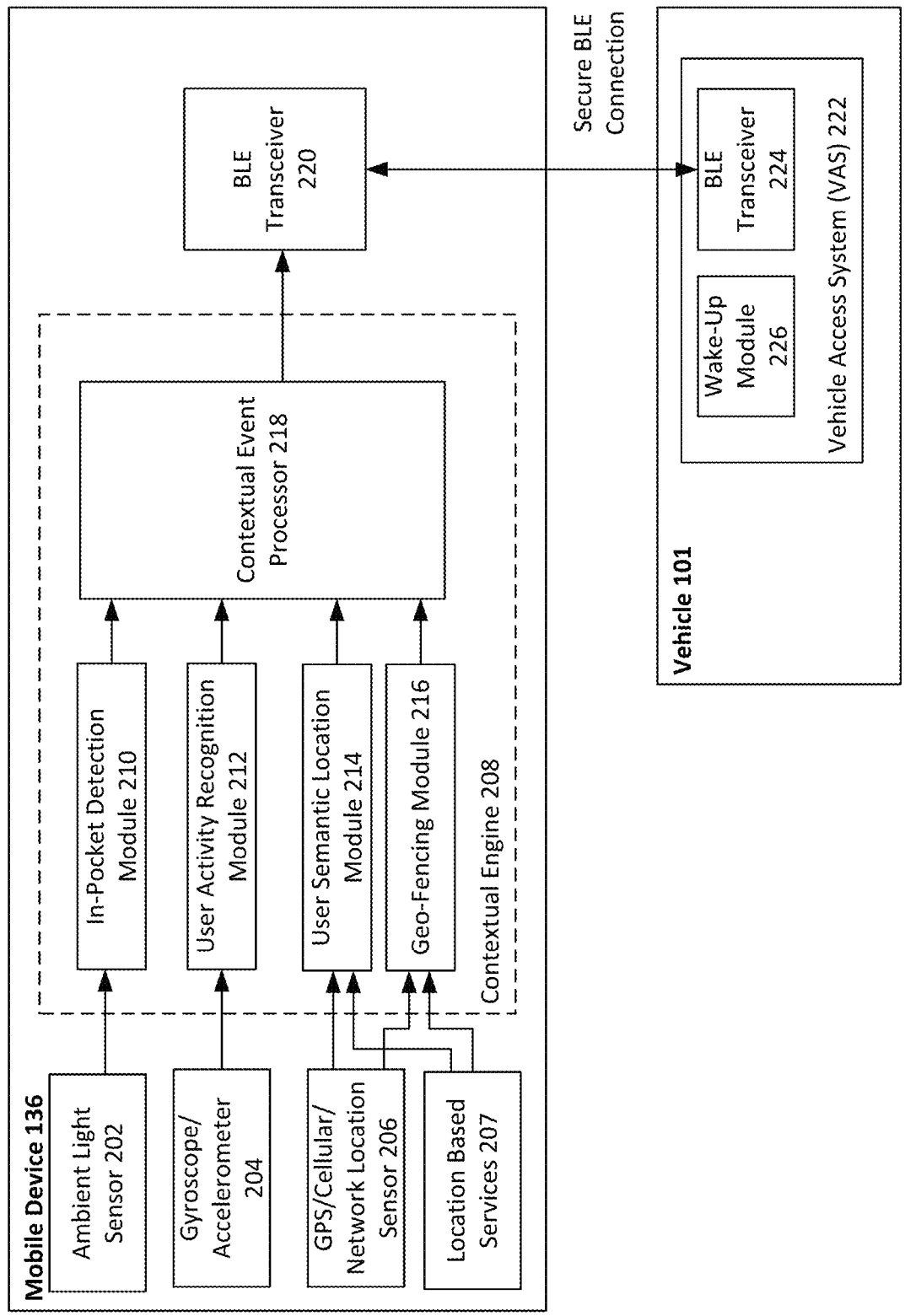
FIG. 2 shows a block diagram of components of a system for providing contextual information of a mobile device to a vehicle, in accordance with some embodiments of the present disclosure.

FIG. 2 shows a block diagram of components of a system 200 of vehicle 101 and mobile device 136 of FIG. 1 for providing contextual information of mobile device 136 to vehicle 101, in accordance with some embodiments of the present disclosure. Mobile device 136 may execute instructions stored in memory to run a vehicle interface application to collect information (e.g., sensor/camera data, accelerometer data, location data, etc.), to determine contextual information of mobile device 136 based on the collected information, and to communicate the determined contextual information to vehicle 101 over a secure BLE connection established with vehicle 101. The vehicle interface application may use existing hardware and sensors of mobile device 136 to collect the information used to determine the contextual information. The contextual information may serve as an indication for conditions (e.g., environmental conditions) that may affect the strength of the secure BLE connection between mobile device 136 and vehicle 101 (e.g., by affecting the antenna/signal strength). In one example, if mobile device 136 is in the pocket of a user, the strength of the secure BLE connection (e.g., signal strength) may be attenuated. In another example, if mobile device 136 is in a parking garage with vehicle 101, the strength of the secure BLE connection may be amplified. However, it should be understood that these are only two examples and that the vehicle interface application may collect/obtain any suitable information from mobile device 136 that may be used to determine if there are any conditions that may affect the strength of the BLE connection.

As shown, mobile device 136 includes contextual engine 208 including in-pocket detection module 210, user activity recognition module 212, user semantic location module 214 and geo-fencing module 216. Although only four modules are shown, it should be understood that contextual engine 208 may include more or fewer modules, depending on what contextual information is desired for a particular application.

In-pocket detection module 210 may determine if mobile device 136 is in the pocket of a user based on data from ambient light sensor 202. For example, if no ambient light is detected by ambient light sensor 202, in-pocket detection module 210 may determine that the mobile device 136 is likely in the pocket of a user. In some embodiments, in-pocket detection module 210 may utilize data from other sensors to improve the determination of whether mobile device 136 is in the pocket of a user. For example, in-pocket detection module 210 may further consider the current lock/unlock state of a screen of mobile device 136, the temperature of mobile device 136, as well as data from gyroscope/accelerometer 204 to determine whether mobile device 136 is in the pocket of a user, as well as the depth of the pocket and the location of the pocket relative to the user and vehicle 101 (e.g., front/side/rear pocket). For example, data from gyroscope/accelerometer 204 may vary based on whether mobile device 136 is being held by a user, is in a front pocket of a user, or is in a back pocket of a user. In some embodiments, in-pocket detection module 210 may determine if mobile device 136 is in a bag of a user (e.g., a backpack or purse). In some embodiments, in-pocket detection module 210 may leverage application programming interfaces (APIs) of the operating system (OS) of mobile device 136 to determine if mobile device 136 is in a pocket of a user or is in any other bag that may act to attenuate the signal received by vehicle 101.

User activity recognition module 212 may determine events related to user activity based on data from gyroscope/accelerometer 204. For example, user activity recognition module 212 may determine if a user is still, walking, running, riding a scooter, etc. In some embodiments, user activity recognition module 212 may leverage development kits provided by the OS of mobile device 136 for low-power activity sensing, thereby improving the battery life of mobile device 136. In some embodiments, user activity recognition module 212 may utilize data from other sensors to improve the user activity determination. For example, user activity recognition module 212 may further consider GPS/cellular/network location sensor 206 to determine how quickly (or slowly) a user is moving (e.g., still, walking, running, etc.).

User semantic location module 214 may determine if mobile device 136 is in a specific location or type of location based on data from GPS/cellular/network location sensor 206 and/or location-based services 207 provided by the OS of mobile device 136. For example, user semantic location module 214 may determine if mobile device 136 is in a trusted place (e.g., the user's home or office) or a public place (e.g., shopping mall, parking lot, parking garage).

Geo-fencing module 216 may determine if mobile device 136 is in a custom geofenced area based on data from GPS/cellular/network location sensor 206 and/or location-based services 207 provided by the OS of mobile device 136.

Contextual events processor 218 may identify contextual events based on data from one or more of in-pocket detection module 210, user activity recognition module 212, user semantic location module 214, and geo-fencing module 216 and selectively output contextual information to BLE transceiver 220 to be communicated to vehicle 101. In some embodiments, contextual events processor 218 may apply processing to smooth data and track contextual information over time (e.g., to avoid communicating errant data to vehicle 101). As explained in greater detail with reference to FIG. 4, contextual information may be included in a BLE packet transmitted to vehicle 101 over a secure BLE connection.

As shown, vehicle 101 may include VAS 222 including BLE transceiver 224 (e.g., implemented by communications circuitry 134) and wake-up module 226 (e.g., implemented by processing circuitry 102). As explained in greater detail below, wake-up module 226 may determine the distance between mobile device 136 and vehicle 101 based on RSSI and the contextual information received from mobile device 136 to provide reliable passive entry to vehicle 101 under a variety of conditions.

Figure 3:
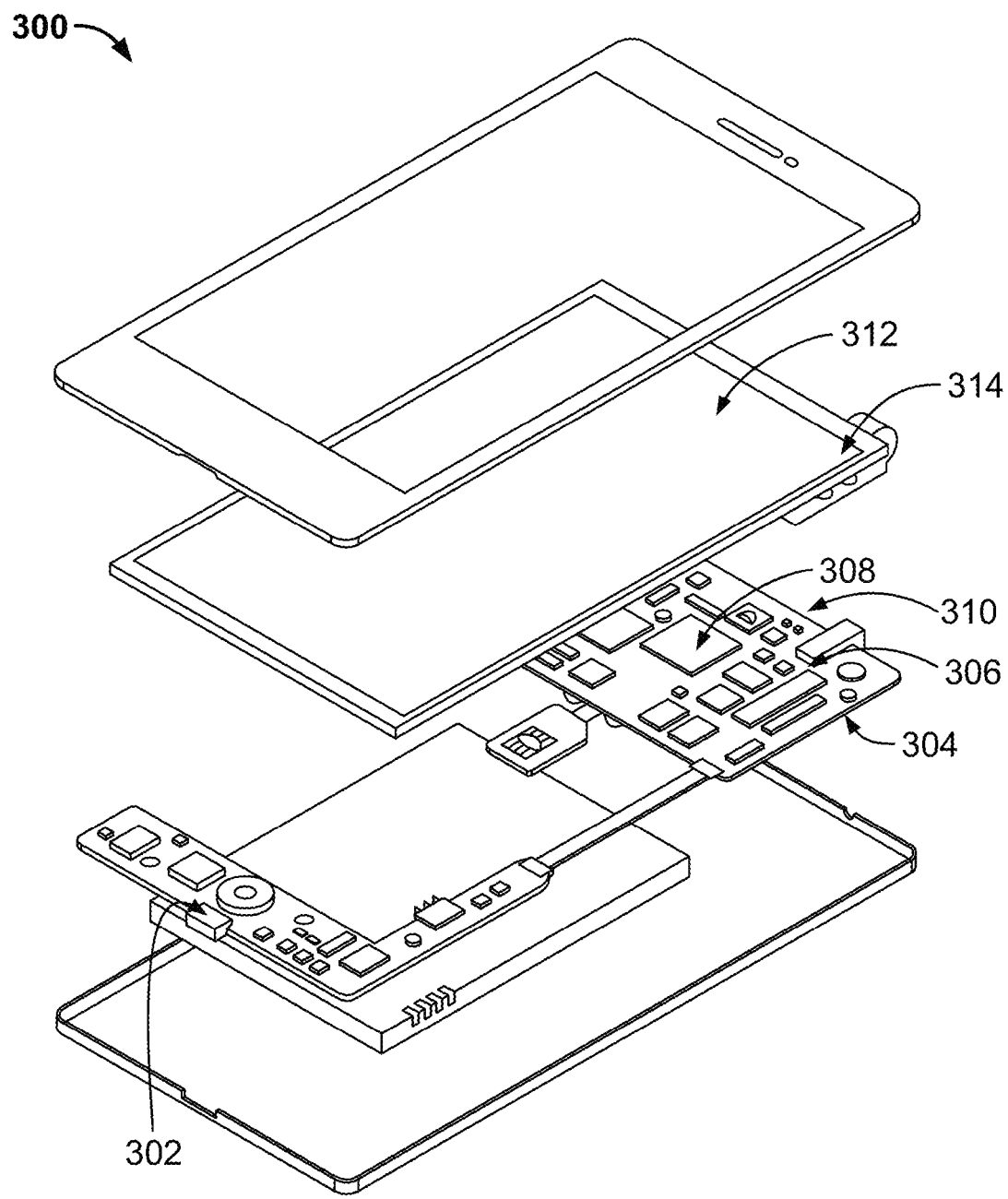
FIG. 3 shows an illustrative mobile device for controlling a vehicle using a vehicle interface application, in accordance with some embodiments of the present disclosure.

FIG. 3 shows an illustrative mobile device 300 for controlling vehicle 101 using a vehicle interface application, in accordance with some embodiments of the present disclosure. Mobile device 136 of FIGS. 1 and 2 may be implemented as the mobile device 300. As shown, the mobile device 300 may be a smartphone. As shown, mobile device 300 includes and input/output (I/O) path 302, control circuitry 304, which includes processing circuitry 306 and storage 308, one or more sensors 310, user input interface 312, and display 314. Mobile device 300 may receive and send data (e.g., authentication information, contextual information, etc.) using the I/O path 302, which may connect the control circuitry 304 (and specifically processing circuitry 306) to the communication paths described above (e.g., the BLE communication path and the mobile communication path). Control circuitry 304 may be based on any suitable processing circuitry such as processing circuitry 306. Control circuitry 304 may execute instructions for a vehicle interface application stored in memory (i.e., the storage 308). Specifically, control circuitry 304 may be instructed by the vehicle interface application to perform the functions discussed above and below. A user may send instructions to control circuitry 304 using user input interface 312. User input interface 312 may be any suitable user interface, such as a touchscreen, a voice recognition interface, etc. Display 314 may be provided as a stand-alone device or integrated with other elements of mobile device 300. For example, display 314 may be a touchscreen that is integrated or combined with the user input interface 312.

Figure 4:
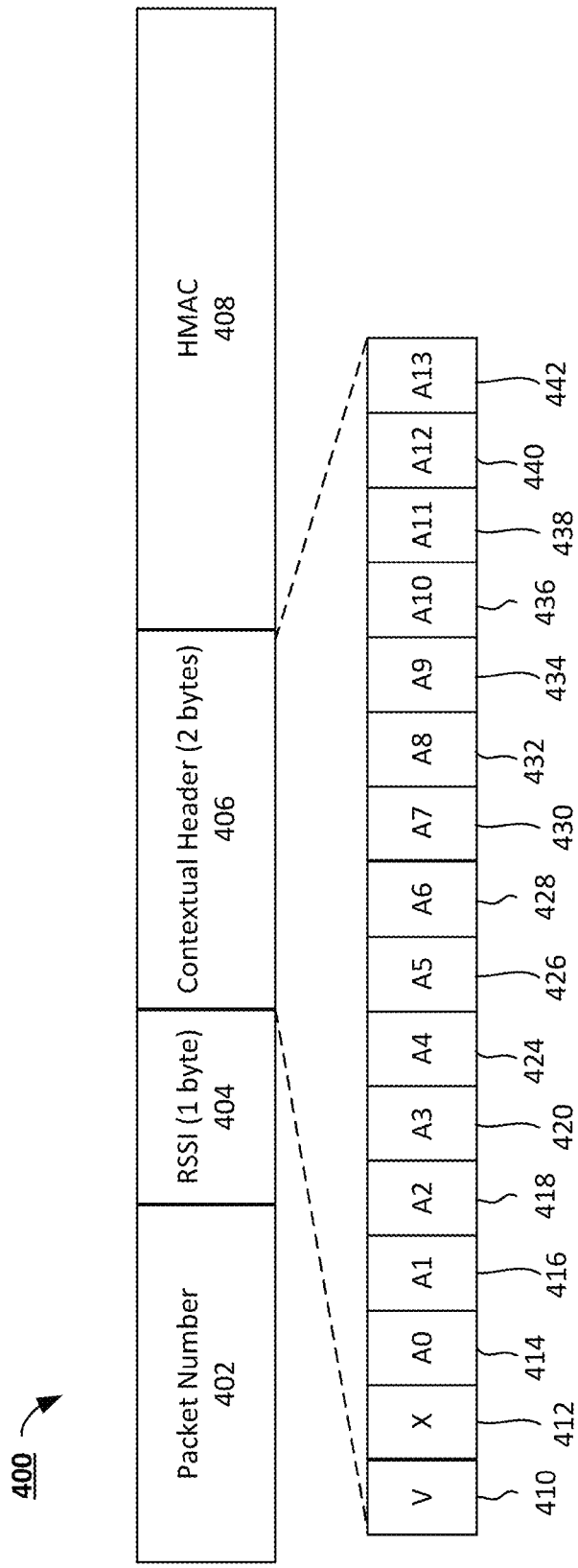
FIG. 4 shows an illustrative data format of a packet communicated from a mobile device to a vehicle via a BLE connection, in accordance with some embodiments of the present disclosure.

FIG. 4 shows an illustrative data format of a packet 400 communicated from mobile device 136 to vehicle 101 via a BLE connection, in accordance with some embodiments of the present disclosure. Packet 400 may be a BLE command that is communicated from mobile device 136 to vehicle 101 after a secure BLE connection is established (e.g., after mobile device 136 is connected and authenticated by a master BLE transceiver with authentication capability). As shown, packet 400 includes a plurality of portions including packet number portion 402, RSSI portion 404, contextual header portion 406, and HMAC portion 408. Packet number portion 402 may be used to establish packet ordering, RSSI portion 404 includes an RSSI value, and HMAC portion 408 is used to establish a secure connection. Contextual header portion 406 may be a portion for communicating contextual information aggregated by contextual events processor 218 of FIG. 2, as described below.

As shown, contextual header portion 406 may be a two-byte data field including a validity bit (V 410), an extension flag bit (X 412), and 14 attribute bits (A0 414-A13 442). Validity bit V 410 may be used to indicate whether the attribute bits (A0 414-A13 442) should be read (e.g., set to 1 if valid). By setting validity bit V 410 to invalid (e.g., set to 0), the remainder of contextual header portion 406 does not need to be parsed, and the last known contextual information (e.g., included in the last valid contextual header portion) is used, thereby allowing contextual header portion 406 to refresh at a lower frequency than that of RSSI transmission, which may change much more quickly than contextual information of mobile device 136. Extension flag bit X 412 may provide future-proof capability to extend definitions of the contextual header portion 406. For example, if extension flag bit X 412 is flagged (e.g., set to 1), another 16-bit extension header may be included after contextual header portion 406.

Attribute bits (A0 414-A13 442) represent the contextual information aggregated by contextual events processor 218 of FIG. 2 at the time when RSSI values are captured. Table 1 below includes one example of the attributes that may be represented by attribute bits (A0 414-A1 416). As shown, each attribute is represented by two bits (e.g., corresponding to four possible values or interpretations). However, this is only an example and each attribute may be represented by one bit or greater than two bits.

TABLE 1

| A(x) | Attribute | Interpretation |
|---|---|---|
| A0-A1 | Inside Pocket | 00 - Indeterminate<br>01 - Not Inside Pocket<br>10 - Inside Pocket<br>11 - In Transition |
| A2-A3 | Pocket Type | 00 - Indeterminate<br>01 - Front Pocket<br>(small attenuation when approaching)<br>10 - Back Pocket<br>(large attenuation when approaching)<br>11 - Deep Pocket<br>(large attenuation all directions) |
| A4-A5 | Movement Speed | 00 - Indeterminate<br>01 - Still<br>10 - Walking<br>11 - Running |
| A6-A7 | Movement Direction | 00 - Indeterminate<br>01 - Moving Toward Vehicle<br>10 - Moving Away from Vehicle<br>11 - Moving (uncertain direction) |
| A8-A9 | At Home | 00 - Indeterminate<br>01 - At Home<br>10 - Not at Home<br>11 - In Transition |
| A10-A11 | At Custom Place | 00 - Indeterminate<br>01 - At Custom Place<br>10 - Not at Custom Place<br>11 - In Transition |
| A12-A13 | | Reserved |

In addition to packet 400, mobile device 136 may also communicate profile information of mobile device 136. The profile information may include information related to the type of device (e.g., folded phone, iOS phone, Android phone, phone model, etc.). In some embodiments, each profile may be linked to a set of specific parameters used for distance modeling. For example, BLE characteristics of different mobile devices may be significantly different from each other. Accordingly, each set of specific parameters may represent the RSSI-to-distance relationship. In some embodiments, the RSSI-to-distance relationship may be established by calibrating the RSSI value when the mobile device is separated from vehicle 101 by one meter and adjusting the RSSI-to-distance relationship based on a scaling factor dependent on the specific environment. For example, the RSSI-to-distance relationship for a particular mobile device in a specific environment may be determined based on the equation $d=(RSSI_i(do)-RSSI_i(d))/10*n$, where $d_0$ is one meter, d is the current distance, and n is a scaling factor dependent on the specific environment (e.g., an indoor parking garage). In some embodiments, a distance model is generated from a curve fitting the calibration data (e.g., logarithmic curve fitting). In some embodiments, each set of specific parameters may be stored in a look-up table (LUT).

In some embodiments, the RSSI-to-distance relationship may be established by calibrating the RSSI value when the mobile device is in vehicle 101. In one example, if the mobile device detected at a known location within vehicle 101 (e.g., a wireless charging pad), the RSSI value may be calibrated based on the known distance between the known charging location and one or more BLE transceivers in vehicle 101.

In some embodiments, it may be advantageous to monitor the behavior of a user (e.g., the driver) of the mobile device over time to calibrate the RSSI value when the mobile device is in a pocket of the user. For example, for a particular user, there is a high probability that they will keep their mobile device in the same pocket (e.g., their front left pocket). Additionally, there is also a high probability that the user (e.g., the driver) will sit in a fixed location when entering vehicle 101 (e.g., the driver's seat of vehicle 101). Thus, by monitoring the behavior of the user of the mobile device, the RSSI-to-di stance relationship for a particular user, when the mobile device is in a pocket of the user, may be established by calibrating the RSSI value when the user is sitting in vehicle 101, based on the estimated distance between the location of the user's pocket and one or more BLE transceivers in vehicle 101. Thereafter, when the user is approaching vehicle 101, the RSSI-to-distance relationship calibrated for the user may be retrieved from a profile associated with the user, and a more accurate distance model may be provided. In some embodiments, different RSSI-to-distance relationships for a particular user may be determined based on the clothes that the user is likely wearing and whether those clothes are likely to interfere with the RSSI value. For example, a cold weather RSSI-to-distance relationship may be determined when the user is likely wearing a coat with deep pockets (e.g., which may reduce the RSSI value), and a warm weather RSSI-to-distance relationship may be determined when the user is likely not wearing a coat.

In some embodiments, the profile information may be an eight-bit parameter corresponding to a LUT for different device profiles. As described in further detail below with reference to FIG. 8, when a new device is added to a user profile (e.g., a user logs in to a vehicle interface application on a new smartphone), a new set of specific parameters used in distance modeling may be loaded. Table 2 below includes one example of an eight-bit phone profile parameter that indicates the corresponding LUT ("phone model LUT") to use for distance modeling for different phones. However, this is only one example, and a set of parameters for distance modeling may be associated with a device in any suitable manner.

TABLE 2

| Phone | Phone Model LUT | Comment |
|---|---|---|
| 0 | LUT00 | Default LUT |
| 1 | LUT01 | iPhone LUT |
| 2 | LUT02 | Samsung phone LUT |
| 3 | LUT03 | Pixel phone LUT |
| 4 | LUT04 | Reserved |
| 5 | LUT05 | Reserved |
| 6 | LUT06 | Reserved |
| 7 | LUT07 | Reserved |

Figure 5A:
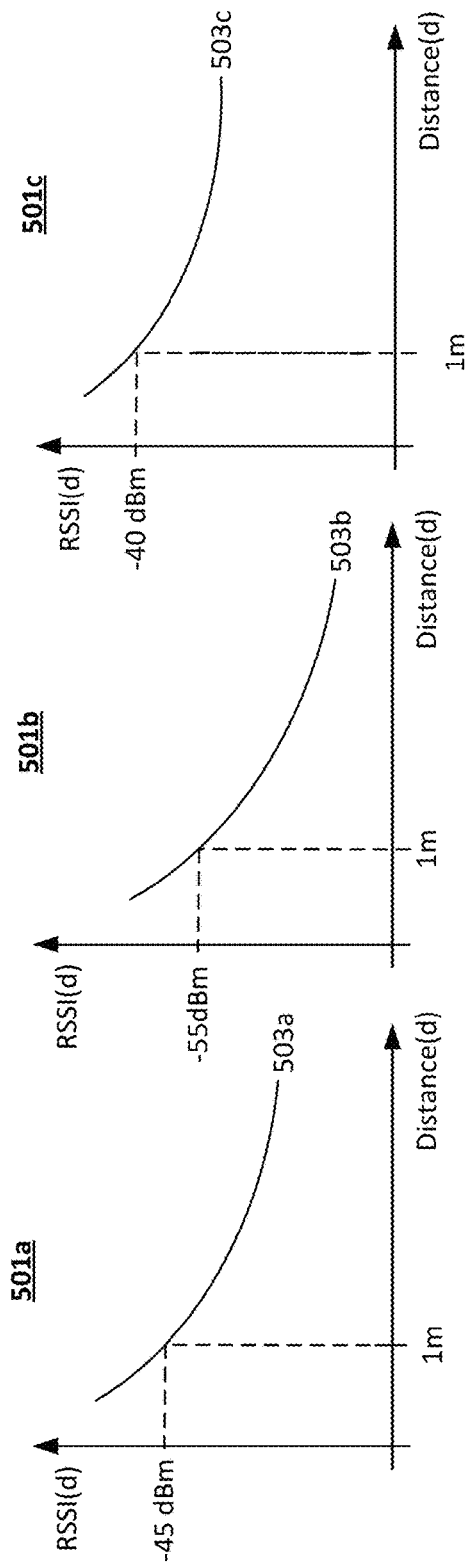
FIGS. 5A and 5B show illustrative distance models for different mobile devices in various environments, in accordance with some embodiments of the present disclosure.
Figure 5B:
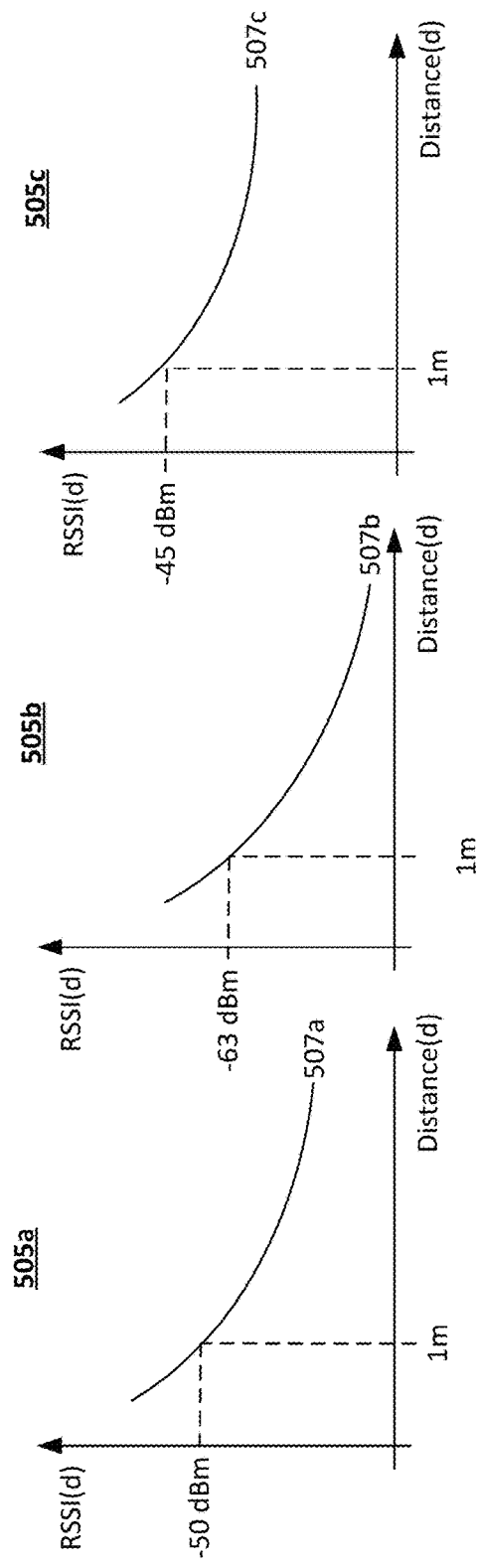

FIGS. 5A and 5B show illustrative distance models for different mobile devices in various environments, in accordance with some embodiments of the present disclosure. As shown, each distance model (501a, 501b, 501c, 505a, 505b, and 505c) includes an RSSI-to-distance relationship that is calibrated for a particular mobile device in a particular environment, as explained above. In some embodiments, certain distance models include a user specific RSSI-to-distance relationship (e.g., and RSSI-to-distance relationship calibrated when the particular mobile device is the user's pocket, as explained above). As explained in further detail below, when a mobile device (e.g., mobile device 136) is detected by vehicle 101, a particular distance model for determining the distance between mobile device 136 and vehicle 101 may be selected based on received contextual information of mobile device 136 and device profile information of mobile device 136. In some embodiments, a selected distance model may be adjusted (e.g., by applying a scaling factor) based on other detected conditions that may affect the RSSI-to-distance relationship (e.g., the number of surrounding cars in a parking lot).

FIG. 5A shows illustrative distance models 501a, 501b, and 501c (collectively referred to as distance models 501) for a first mobile device. For example, with reference to Table 2 above, the first mobile device may be "Phone 1" and the distance models may be stored in "LUT01." Distance model 501a may be a distance model representing a situation in which a user approaches vehicle 101 with the first mobile device in their hand (e.g., not in a pocket or bag). For example, when attribute bits A0 414-A1 416, in packet 400 received by vehicle 101, indicate "not in pocket" (e.g., "01"), distance model 501a may be selected. As shown by curve 503a in distance model 501a, when the first mobile device is one meter away from vehicle 101, the RSSI value corresponds to a received signal power of −45 decibel milliwatts (dBm). In some embodiments, because RSSI is a relative value and dBm is an absolute value, the RSSI value may be specified on a scale of 0 to 255 and may correspond the absolute number representing the received signal power (e.g., in dBm).

Distance model 501b may be a distance model representing a situation in which a user approaches vehicle 101 with the first mobile device in their pocket. For example, when attribute bits A0 414-A1 416, in packet 400 received by vehicle 101, indicate "inside of pocket" (e.g., "10"), distance model 501b may be selected. As shown by curve 503b in distance model 501b, when the first mobile device is one meter away from vehicle 101, the RSSI value corresponds to a received signal power of −55 dBm. In some embodiments, distance model 501b may be further adjusted (e.g., by applying a scaling factor) if attribute bits A2 418-A3 420 indicate a pocket type. For example, if attribute bits A2 418-A3 420 indicate that the first mobile device is in a "deep pocket" (e.g., "11"), the scaling factor will adjust distance model 501b so that a further attenuated RSSI value (e.g., −60 dBm) corresponds to a distance of one meter. As explained above, distance model 501b may be calibrated by monitoring the behavior of the of the mobile device over time to calibrate the RSSI value when the mobile device is in a pocket of the user.

Distance model 501c may be a distance model representing a situation in which a user approaches vehicle 101 with the first mobile device in their hand (e.g., not in a pocket or bag), but in an environment that amplifies the BLE signal (e.g., an indoor parking garage). As shown by curve 503c in distance model 501c, when the first mobile device is one meter away from vehicle 101, the RSSI value corresponds to a received signal power of −40 dBm. In some embodiments, distance model 501c may be selected when packet 400 indicates the environment. In some embodiments, vehicle 101 may indicate the environment (e.g., based on a location determined by GPS 126). In some embodiments, vehicle 101 may apply a scaling factor based on environmental determinations (e.g., image sensor 118 identifies obstacles around vehicle 101, such as other vehicles or structures).

FIG. 5B shows illustrative distance models 505a, 505b, and 505c (collectively referred to as distance models 505) for a second mobile device. For example, with reference to Table 2 above, the second mobile device may be "Phone 2" and the distance models may be stored in "LUT02." As similarly discussed above with reference to FIG. 5A, distance model 505a may be a distance model representing a situation in which a user approaches vehicle 101 with the second mobile device in their hand. As shown by curve 507a in distance model 505a, when the second mobile device is one meter away from vehicle 101, the RSSI value corresponds to a received signal power of −50 dBm.

As similarly discussed above with reference to FIG. 5A, distance model 505b may be a distance model representing a situation in which a user approaches vehicle 101 with the second mobile device in their pocket. As shown by curve 507b in distance model 505b, when the second mobile device is one meter away from vehicle 101, the RSSI value corresponds to a received signal power of −63 dBm.

As similarly discussed above with reference to FIG. 5A, distance model 505c may be a distance model representing a situation in which a user approaches vehicle 101 with the second mobile device in their hand, but in an environment that amplifies the BLE signal. As shown by curve 507c in distance model 505c, when the first mobile device is one meter away from vehicle 101, the RSSI value corresponds to a received signal power of −45 dBm. Although three distance models are described for each mobile device, it should be understood that any suitable number of distance models may be associated with one or more mobile devices. In some embodiments, parameters for one or more distance models may be stored in a LUT. Further, in some embodiments, it should be understood that for one or more distance models, a calibrated RSSI-to-distance value at a one-meter distance may be determined (e.g., measured) and stored along with scaling factors for each environment. Still further, it should be understood that the user specified calibrated RSSI-to-distance value may be determined (e.g., measured) for a particular user when the user is sitting inside of vehicle 101. Still further, it should be understood that more than one scaling factor may be combined to generate or adjust a distance model to reflect the current environmental conditions. Still further, it should be understood that if contextual information from the approaching mobile device indicates a change in environment (e.g., a user takes their phone out of their pocket), the currently selected distance model may be replaced with a new distance model corresponding to the change.

Figure 6:
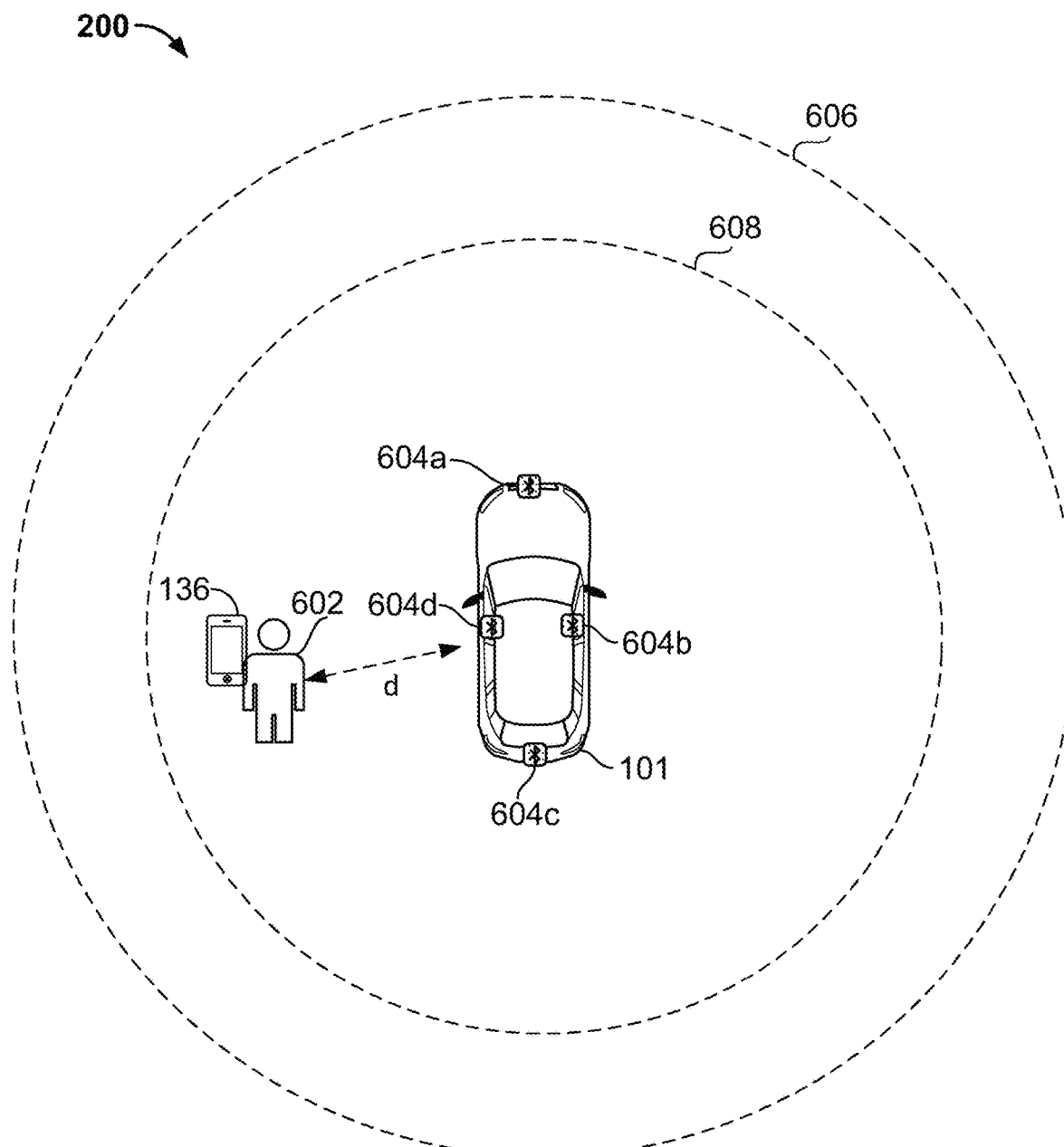
FIG. 6 shows an illustrative diagram for providing passive entry to a vehicle, in accordance with some embodiments of the present disclosure.

FIG. 6 shows an illustrative diagram 600 for providing passive entry to vehicle 101, in accordance with some embodiments of the present disclosure. The process may be executed by processing circuitry 102 and mobile device 136 of FIG. 1, or, more specifically, system 200 of FIG. 2. As shown, user 602 may be located outside of vehicle 101. In some embodiments, vehicle 101 may have transitioned to a sleep state in order to conserve battery. While in the sleep state, VAS 222 may monitor the area around vehicle 101 to detect the presence of user 602. For example, in one embodiment, VAS 222 (e.g., a domain controller/module implemented by communications circuitry 134 and processing circuitry 102 of FIG. 1) may listen, using a plurality of BLE transceivers (604a, 604b, 604c, 604d, collectively referred to as BLE transceivers or BLE sensors), for an advertisement from mobile device 136 (e.g., an authorized mobile device) of user 602, transmitted according to the BLE standard. In some embodiments, VAS 222 may determine the RSSI of the advertisement from one or more of BLE transceivers 604 and select the one with the highest RSSI to determine the distance of mobile device 136 from vehicle 101. For example, the BLE transceiver with the highest RSSI may correspond to the BLE transceiver with the best line-of-sight to mobile device 136 and may therefore provide the best estimate of the distance ("d") of mobile device 136 from vehicle 101.

In response to establishing a secure BLE connection between mobile device 136 and VAS 222, VAS 222 may receive packets (e.g., packets 400) including contextual information of mobile device 136. As described above, VAS 222 may also receive profile information of mobile device 136. Based on the received contextual information and profile information, VAS 222 may select a distance model (e.g., one of the distance models illustrated in FIGS. 5A and 5B) and determine the distance d based on the selected distance model and determined RSSI values. Once VAS 222 determines that mobile device 136 is within a predetermined range, mobile device 136 may initiate a passive entry feature.

Although passive entry (e.g., unlocking one or more doors of vehicle 101) is described as the passive entry feature, it should be understood that the passive entry feature (or sequence of actions) may include additional actions or steps performed at the same or different times. For example, if certain domain controllers of vehicle 101 take several seconds to wake up, the passive entry feature may include waking up the domain controllers as the user is approaching vehicle 101 so the user does not have to wait for certain functions to be available when reaching vehicle 101. For example, as shown, when VAS 222 determines that mobile device 136 enters a near zone defined by boundary line 606 (which may be approximately 10 meters), VAS 222 begins transitioning certain domain controllers (electronic control units) of vehicle 101 from a sleep state to a standby or ready state, so that the domain controllers that take several seconds to wake up may be quickly transitioned to an on state when the user reaches the vehicle. In some embodiments, boundary line 606 may be dynamically determined based on how quickly the user is approaching the vehicle.

When VAS 222 determines that mobile device 136 enters a close zone defined by boundary line 608 (which may be approximately 1-2 meters), VAS 222 may automatically unlock one or more doors of vehicle 101 to provide passive entry to vehicle 101. A passive entry algorithm executed by VAS 222 may require a threshold number of RSSI samples before making a determination to unlock one or more doors. However, in some embodiments, if the received contextual information of mobile device 136 indicates that the user is quickly approaching vehicle 101 (e.g., attribute bits A4 424-A7 430 indicate that the user is running toward vehicle 101), the threshold number of RSSI samples may be reduced so as to enable VAS 222 to make a decision to unlock one or more doors before the user reaches vehicle 101.

In some embodiments, VAS 222 may modify wake-up boundaries or thresholds based on location information (e.g., provided by user semantic location module 214 or geofencing module 216 of FIG. 2 or by vehicle 101). For example, when vehicle 101 is at a public place (e.g., a shopping mall), VAS 222 may wait until the user is closer to vehicle 101 before unlocking vehicle 101 (e.g., compared to when vehicle 101 is at a trusted location). Additionally, when vehicle 101 is at the home of a user, VAS 222 may use machine learning to adjust wake-up boundaries based on historical information (e.g., associated with a user profile) to avoid initiating the wake-up process when the user walks by their garage. However, this is only one example; VAS 222 may adjust wake-up boundaries, distance models, parameter sensitivity or any other components of the passive entry algorithm based on historical information.

Figure 7:
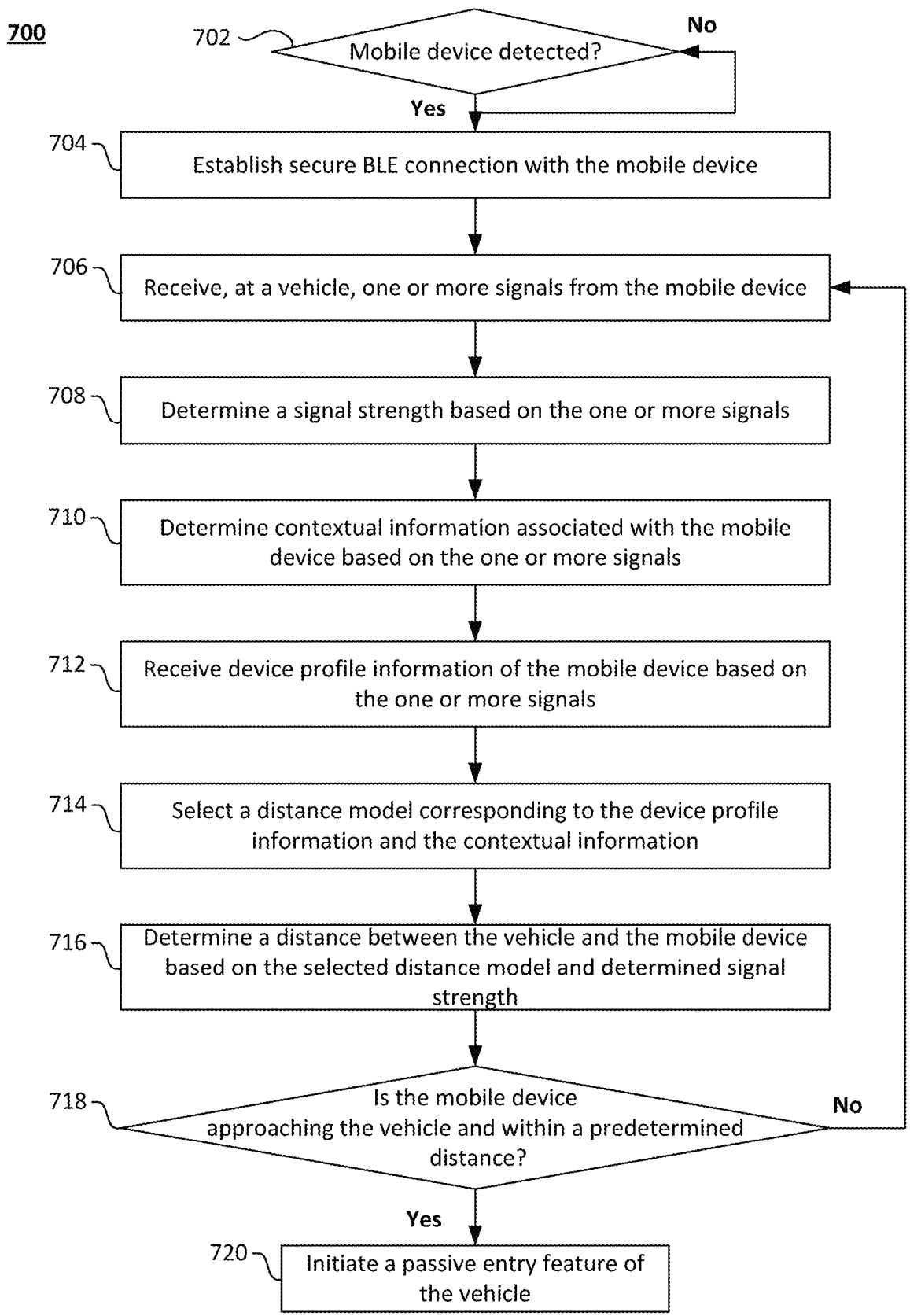
FIG. 7 shows a flowchart of an illustrative process for providing passive entry to a vehicle, in accordance with some embodiments of the present disclosure.

FIG. 7 shows a flowchart of an illustrative process 700 for providing passive entry to vehicle 101, in accordance with some embodiments of the present disclosure. The process may be executed by processing circuitry 102 of FIG. 1, or, more specifically, VAS 222 of FIG. 2. Process 700 begins at step 702 when processing circuitry 102 detects a mobile device (e.g., mobile device 136) in the vicinity of vehicle 101. For example, processing circuitry 102 may detect an advertisement signal from the mobile device (e.g., via BLE).

At 704, processing circuitry 102 may establish a secure BLE connection with the mobile device. For example, processing circuitry 102 may authenticate the detected mobile device to establish the secure BLE connection.

At 706, processing circuitry 102 may receive one or more signals from the mobile device over the secure BLE connection. For example, processing circuitry 102 may receive from an application executing on the mobile device associated with a user, the one or more signals. For example, processing circuitry 102 may receive a plurality of the command packets illustrated in FIG. 4.

At 708, processing circuitry 102 may determine a signal strength based on the one or more signals. For example, processing circuitry 102 may determine RSSI values of the one or more signals. In some embodiments, an RSSI value is determined from each signal (e.g., command packet). In some embodiments, multiple values are determined across multiple signals, and an average or medium value is selected as the determined signal strength for the multiple signals.

At 710, processing circuitry 102 may determine contextual information associated with the mobile device based on the one or more signals. For example, processing circuitry 102 may receive the contextual header described above with reference to FIG. 4 (e.g., contextual header portion 406). Processing circuitry 102 may parse a received contextual header to identify the contextual information associated with the mobile device (e.g., indicating whether the mobile device is in the pocket or backpack of a user thereby impacting the received signal strength). In some embodiments, processing circuitry 102 may receive contextual information in one or more other signals from the mobile device (e.g., via other BLE signals or cellular signals). In some embodiments, step 710 may be combined with step 708.

At 712, processing circuitry 102 may receive device profile information associated with the mobile device based on the one or more signals. In some embodiments, device profile information may be transmitted separately from the packets including the contextual header. For example, processing circuitry 102 may recognize previously paired mobile devices based on a received BLE advertisement. In some embodiments, processing circuitry 102 may determine a user profile associated with the recognized device.

At 714, processing circuitry 102 may select a distance model corresponding to the device profile information and the contextual information. In some embodiments, selecting a distance model includes selecting a distance model and modifying the selected distance model based on one or more additional environmental factors that may affect the RSSI-to-distance relationship of the selected distance model (e.g., as the additional environmental factors are not accounted for by the selected distance model). For example, if the vehicle is parked in an outdoor parking lot and the user approaches the vehicle with the phone in their pocket, processing circuitry 102 may select a corresponding distance model (if available). If, however, the selected distance model does not correspond to the number of cars that are in the outdoor parking lot (e.g., the vehicle determines that the outdoor parking lot is more or less crowded than the environment associated with the distance model), processing circuitry 102 may modify the selected distance model to more closely reflect the current vehicle environment (e.g., by apply a correction factor to the selected distance model). In some embodiments, selecting a distance model includes selecting a user specific distance model associated with a profile of a particular user when the user approaches the vehicle with the phone in their pocket. For example, the selected distance model may include a calibrated received signal strength indicator (RSSI) value that was calibrated when the mobile device is in the pocket of the user and the user is sitting in the vehicle.

At 716, processing circuitry 102 may determine a distance between vehicle 101 and the mobile device based on the selected distance model and the determined signal strength. For example, if distance model 501a of FIG. 5A is selected, processing circuitry 102 may determine the distance as one meter if the determined signal strength is −45 dBm)

At 718, processing circuitry 102 may determine if the mobile device is approaching vehicle 101 and has entered within a predetermined distance from vehicle 101 (e.g., based on the determined distance). In response to determining that the mobile device is approaching vehicle 101 and within the predetermined distance ("Yes" at step 718), process 700 proceeds to step 720. Otherwise ("No" at step 720), processing circuitry returns to step 706 and continues to receive signals and determine changes in distance (or contextual information). In some embodiments, steps 710-714 may not be performed each time a new signal (e.g., packet 400) is received. For example, as detailed above, if validity bit V 410 is set to invalid for a received packet 400, processing circuitry 102 may skip parsing contextual header portion 406 and determine the updated distance (step 716) based on the last known contextual information (e.g., included in the last valid contextual header portion). In some embodiments, by periodically skipping steps 710-714, the distance may still be accurately determined while reducing processing (e.g., because RSSI may change more quickly than contextual information).

At 720, processing circuitry 102 may initiate a passive entry feature of vehicle 101. For example, as described above with reference to FIG. 6, processing circuitry 102 may first wake up domain controllers in response to determining that the mobile device is within a first distance, before unlocking one or more doors of vehicle 101 in response to determining that the mobile device is within a second distance less than the first distance. However, this is only one example, and the processing circuitry 102 may execute any suitable passive entry features based on the determined distance.

Figure 8:
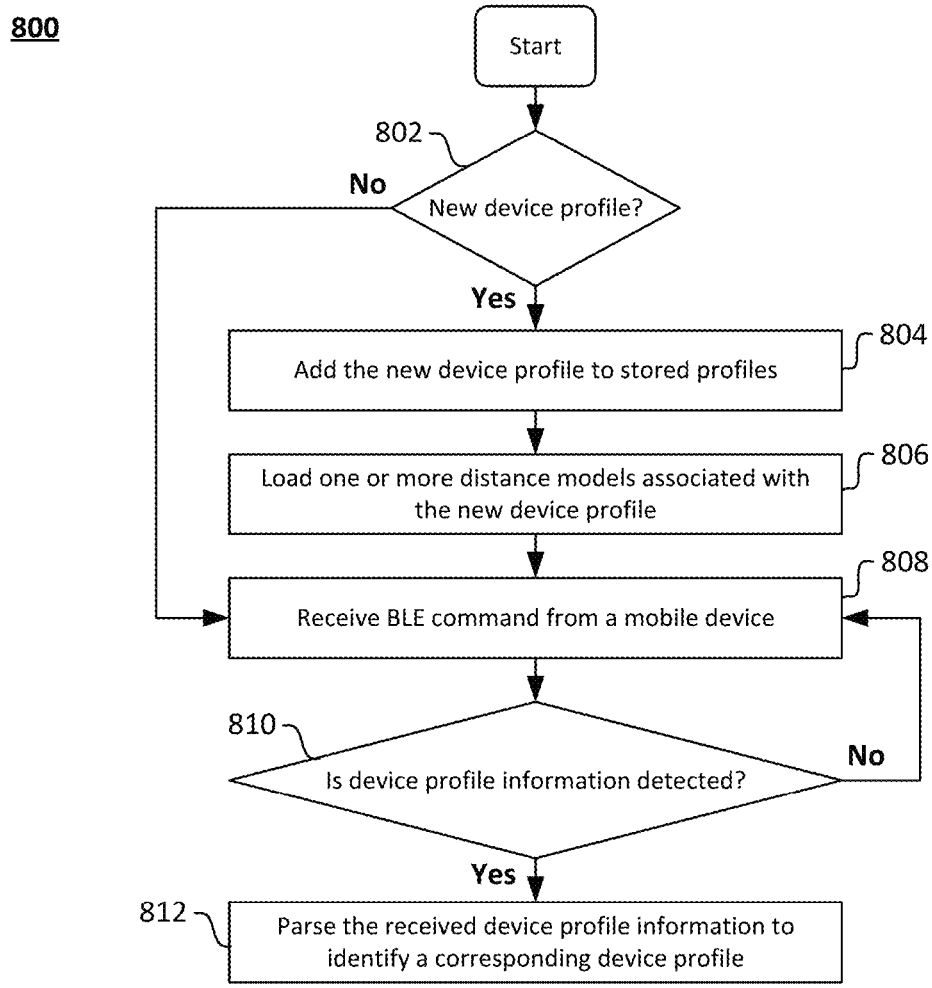
FIG. 8 shows a flowchart of an illustrative process for adding new device profiles and for selecting a distance model based on the received device profile information, in accordance with some embodiments of the present disclosure.

FIG. 8 shows a flowchart of an illustrative process 800 for adding new device profiles and for selecting a distance model based on the received device profile information, in accordance with some embodiments of the present disclosure. The process may be executed by processing circuitry 102 of FIG. 1, or, more specifically, VAS 222 of FIG. 2. Process 800 begins at step 802 when processing circuitry 102 determines if any new device profiles have been received. For example, in each vehicle software over-the-air (OTA) update, VAS 222 may check for any new device profiles (e.g., new device profile LUT) included in the software package. In some embodiments, new device profiles may be provided via a server (e.g., server 138). In response to determining that no new device profiles have been received ("No" at step 802), process 800 proceeds to step 808. Otherwise ("Yes" at step 802), process 800 proceeds to step 804.

At 804, processing circuitry 102 may add the new device profile to stored profiles. For example, processing circuitry 102 may add the new device profile to a stored table or database (e.g., as described in Table 2 above) by updating device profile LUT enumerated ("enum") definitions.

At 806, processing circuitry 102 may load one or more distance models associated with the new device profile to VAS 222, before any new mobile device is connected and authenticated to VAS 222. In some embodiments, once the new mobile device is connected and authenticated to VAS 222 after the one or more distance models have been loaded to VAS 222, the new mobile device may provide updated values or distance models by a device profile builder in the vehicle interface application executed by the new mobile device.

At 808, during normal operation (e.g., when passive entry is enabled), processing circuitry 102 may listen for and receive BLE commands from one or more mobile devices associated with vehicle 101. For example, processing circuitry may listen for an advertisement (e.g., a BLE advertisement packet) from the one or more mobile devices.

At 810, in response to receiving a BLE command, processing circuitry 102 may parse the BLE command to determine if the BLE command includes any device profile information. In response to determining that the BLE command does not include any device profile information ("No" at step 810), process 800 returns to step 808 and waits to receive another BLE command. Otherwise ("Yes" at step 810), process 800 proceeds to step 812.

At 812, processing circuitry 102 may parse the received device profile information to identify a corresponding device profile (e.g., loaded in VAS 222), as similarly described above in step 712 of FIG. 7.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. For example, if certain contextual information or device profile information is not available, a default distance model or the distance model most closely matching the available information may be selected. Additionally, as described above, steps 710-714 may be periodically skipped while continuing to determine the distance between the vehicle and the mobile device based on the last known contextual information. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method, comprising:
   receiving, at a vehicle and from an application executing on a mobile device associated with a user, one or more signals associated with the mobile device;

determining, using processing circuitry, a signal strength and contextual information associated with the mobile device based on the one or more signals;

selecting, among a plurality of distance models, a distance model corresponding to the contextual information;

determining a distance between the vehicle and the mobile device based on the selected distance model and the signal strength; and initiating, using the processing circuitry, a passive entry feature of the vehicle when the determined distance is within a predetermined distance.

2. The method of claim 1, wherein:

each of the plurality of distance models comprises a calibrated received signal strength indicator (RSSI) value when the mobile device is at a predetermined distance from the vehicle and a scaling factor corresponding to the contextual information; and determining the distance between the vehicle and the mobile device comprises determining the distance based on the calibrated RSSI value and the scaling factor of the selected distance model and the signal strength.

3. The method of claim 1, wherein:

the contextual information comprises an indication that the mobile device is in a pocket of the user or an indication that the mobile device is in a hand of the user; and in response to the contextual information comprising an indication that the mobile device is in the pocket of the user:

the selected distance model comprises a calibrated received signal strength indicator (RSSI) value that was calibrated when the mobile device is in the pocket of the user and the user is sitting in the vehicle; and determining the distance between the vehicle and the mobile device comprises determining the distance based on the calibrated RSSI value and the signal strength.

4. The method of claim 1, wherein the passive entry feature comprises unlocking a door of the vehicle.

5. The method of claim 1, further comprising, in response to the contextual information comprising an indication that the mobile device is quickly approaching the vehicle, reducing a number of samples of the one or more signals required for initiating the passive entry feature.

6. The method of claim 1, further comprising, in response to the contextual information comprising an indication that the mobile device is in a geofenced area, modifying a distance proximity between the vehicle and the mobile device for initiating the passive entry feature.

7. The method of claim 1, further comprising:

establishing a secure Bluetooth low energy (BLE) link between the mobile device and the vehicle; and receiving the one or more signals over the secure BLE link, wherein the contextual information is included in a header in a packet in the one or more signals received over the secure BLE link.

8. The method of claim 1, wherein the contextual information comprises information indicating whether the mobile device is in a pocket of the user, whether the mobile device is in a geofenced area, or whether the mobile device is moving quickly towards the vehicle, or combinations thereof.

9. The method of claim 1, further comprising receiving, using the processing circuitry, device profile information associated with the mobile device based on the one or more signals, wherein initiating the passive entry feature is further based on the device profile information.

10. The method of claim 9, wherein the selected distance model further corresponds to the device profile information.

11. A vehicle, comprising:

a transceiver;

a memory storing instructions; and processing circuitry configured to execute the instructions stored in the memory to:

receive, via the transceiver and from an application executing on a mobile device associated with a user, one or more signals associated with the mobile device;

determine a signal strength and contextual information associated with the mobile device based on the one or more signals;

select, among a plurality of distance models, a distance model corresponding to the contextual information;

determine a distance between the vehicle and the mobile device based on the selected distance model and the signal strength; and initiate a passive entry feature of the vehicle when the determined distance is within a predetermined distance.

12. The vehicle of claim 11, wherein:

each of the plurality of distance models comprises a calibrated received signal strength indicator (RSSI) value when the mobile device is at a predetermined distance from the vehicle and a scaling factor corresponding to the contextual information; and the processing circuitry is configured to determine the distance between the vehicle and the mobile device by determining the distance based on the calibrated RSSI value and the scaling factor of the selected distance model and the signal strength.

13. The vehicle of claim 11, wherein:

the contextual information comprises an indication that the mobile device is in a pocket of the user or an indication that the mobile device is in a hand of the user; and in response to the contextual information comprising an indication that the mobile device is in the pocket of the user:

the selected distance model comprises a calibrated received signal strength indicator (RSSI) value that was calibrated when the mobile device is in the pocket of the user and the user is sitting in the vehicle; and the processing circuitry is configured to determine the distance between the vehicle and the mobile device by determining the distance based on the calibrated RSSI value and the signal strength.

14. The vehicle of claim 11, wherein the passive entry feature comprises unlocking a door of the vehicle.

15. The vehicle of claim 11, wherein the processing circuitry is further configured to:

reduce, in response to the contextual information comprising an indication that the mobile device is quickly approaching the vehicle, a number of samples of the one or more signals required for initiating the passive entry feature; and modify, in response to the contextual information comprising an indication that the mobile device is in a geofenced area, a distance proximity between the vehicle and the mobile device for initiating the passive entry feature.

16. The vehicle of claim 11, wherein:
the processing circuitry is further configured to receive device profile information associated with the mobile device based on the one or more signals; and
the processing circuitry is configured to initiate the passive entry feature further based on the device profile information.

17. The vehicle of claim 16, wherein the selected distance model further corresponds to the device profile information.

18. A non-transitory, computer-readable medium having non-transitory, computer-readable instructions encoded thereon that, when executed by processing circuitry, cause the processing circuitry to:
receive, at a vehicle and from an application executing on a mobile device associated with a user, one or more signals associated with the mobile device;
determine a signal strength and contextual information associated with the mobile device based on the one or more signals;
select, among a plurality of distance models, a distance model corresponding to the contextual information;
determine a distance between the vehicle and the mobile device based on the selected distance model and the signal strength; and
initiate a passive entry feature of the vehicle when the determined distance is within a predetermined distance.

19. The non-transitory, computer-readable medium of claim 18, wherein:
execution of the instructions further causes the processing circuitry to receive device profile information associated with the mobile device based on the one or more signals; and
execution of the instructions to initiate the passive entry feature further causes the processing circuitry to initiate the passive entry feature further based on the device profile information.

20. The non-transitory, computer-readable medium of claim 19, wherein execution of the instructions to select the distance model further causes the processing circuitry to:
select a distance model further corresponding to the device profile information.

\* \* \* \* \*